United States Patent
Cairl et al.

(10) Patent No.: US 11,427,404 B2
(45) Date of Patent: Aug. 30, 2022

(54) SYSTEM AND METHOD FOR ROBOT-ASSISTED, CART-BASED WORKFLOWS

(71) Applicant: Fetch Robotics, Inc., San Jose, CA (US)

(72) Inventors: Brian Cairl, Astoria, NY (US); Eric Diehr, San Jose, CA (US); Levon Avagyan, San Jose, CA (US); Sarah Elliott, Mountain View, CA (US); Rohan Bhargava, San Jose, CA (US); Russell Toris, San Jose, CA (US); John W. Stewart, III, San Francisco, CA (US); Derek King, San Jose, CA (US); Melonee Wise, San Jose, CA (US); Niharika Arora, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 16/347,574

(22) PCT Filed: Apr. 10, 2019

(86) PCT No.: PCT/US2019/026848
§ 371 (c)(1),
(2) Date: May 4, 2019

(87) PCT Pub. No.: WO2019/200012
PCT Pub. Date: Oct. 17, 2019

(65) Prior Publication Data
US 2021/0284446 A1  Sep. 16, 2021

Related U.S. Application Data

(60) Provisional application No. 62/655,755, filed on Apr. 10, 2018, provisional application No. 62/655,744, filed on Apr. 10, 2018.

(51) Int. Cl.
*G06F 7/00* (2006.01)
*B65G 1/06* (2006.01)
(Continued)

(52) U.S. Cl.
CPC .............. *B65G 1/065* (2013.01); *B65G 1/137* (2013.01); *G05D 1/0027* (2013.01);
(Continued)

(58) Field of Classification Search
CPC ...... B65G 1/065; B65G 1/137; G05D 1/0027; G05D 1/0274; G05D 1/0214; G05D 1/0044; G05D 2201/0216
(Continued)

(56) References Cited

U.S. PATENT DOCUMENTS 6,301,634 B1  10/2001  Gomi et al.
10,755,227 B1 *  8/2020  Aggarwal ............ G06Q 10/087
(Continued)

FOREIGN PATENT DOCUMENTS

WO  2019/200012 A1  10/2019
WO  2019/200018 A1  10/2019

OTHER PUBLICATIONS

Xing et al., "Intersection recognition and guide-path selection for a vision-based AGV in a bidirectional flow network." In: International Journal of Advanced Robotic Systems, (14.01.14) Retrieved on Jun. 9, 2019, <https://journals.sage.pub.com.doi/pdf/10.5772/58218>.
(Continued)

*Primary Examiner* — Yolanda R Cumbess

(57) ABSTRACT

A cart-based workflow system includes: a robot operating in a facility; a server, the server operably connected to the robot, the server configured to do one or more of send the robot a cart transfer location usable for transferring the cart and instruct the robot to specify the cart transfer location; a graphic user interface (GUI) comprising a map of the
(Continued)

facility, the GUI operably connected to the server, the GUI configured to do one or more of receive input from a human user and provide output to the human user, the GUI further configured to be usable by the user to coordinate movement of one or more of robots and carts.

18 Claims, 17 Drawing Sheets

(51) Int. Cl.
    *B65G 1/137*     (2006.01)
    *G05D 1/00*     (2006.01)
    *G05D 1/02*     (2020.01)

(52) U.S. Cl.
    CPC ......... *G05D 1/0044* (2013.01); *G05D 1/0214* (2013.01); *G05D 1/0274* (2013.01); *G05D 2201/0216* (2013.01)

(58) Field of Classification Search
    USPC .......................................... 700/213–218, 228
    See application file for complete search history.

(56) References Cited

U.S. PATENT DOCUMENTS

| | | |
|---|---|---|
| 10,853,561 B2 | 12/2020 | Avagyan et al. |
| 10,860,978 B1* | 12/2020 | Aggarwal .......... G06Q 10/0875 |
| 2006/0293810 A1 | 12/2006 | Nakamoto |
| 2009/0023499 A1 | 1/2009 | Mao |
| 2009/0082949 A1 | 3/2009 | Petrie et al. |
| 2009/0234499 A1 | 9/2009 | Nielsen et al. |
| 2011/0153343 A1 | 6/2011 | Tremblay et al. |
| 2011/0288684 A1 | 11/2011 | Farlow et al. |
| 2013/0085625 A1 | 4/2013 | Wolfe |
| 2015/0234386 A1* | 8/2015 | Zini ..................... G06K 7/0008 701/26 |
| 2015/0312774 A1 | 10/2015 | Lau |
| 2016/0016312 A1 | 1/2016 | Lawrence, II et al. |
| 2016/0046021 A1 | 2/2016 | Wang et al. |
| 2016/0271795 A1 | 9/2016 | Vicenti |
| 2016/0273924 A1 | 9/2016 | Zarem et al. |
| 2017/0102711 A1 | 4/2017 | Watts |
| 2017/0197311 A1 | 7/2017 | Garcia et al. |
| 2018/0247276 A1* | 8/2018 | Tamma .................. G06Q 10/06 |
| 2019/0265720 A1 | 8/2019 | Gupta et al. |
| 2021/0018912 A1 | 1/2021 | Dymesich et al. |
| 2021/0034810 A1 | 2/2021 | Avagyan et al. |

OTHER PUBLICATIONS

International Search Report & Written Opinion from International Patent Application No. PCT/US2019/026848 dated Jul. 16, 2019.
International Search Report & Written Opinion from International Patent Application No. PCT/US2019/026854 dated Jul. 5, 2019.
Szeliski, "Computer Vision: Algorithms and Applications," chapter 3, "Image Processing," pp. 101-204, Sept. 3, 2010., draft published by Springer, obtained through http://szeliski.org/Book.

* cited by examiner

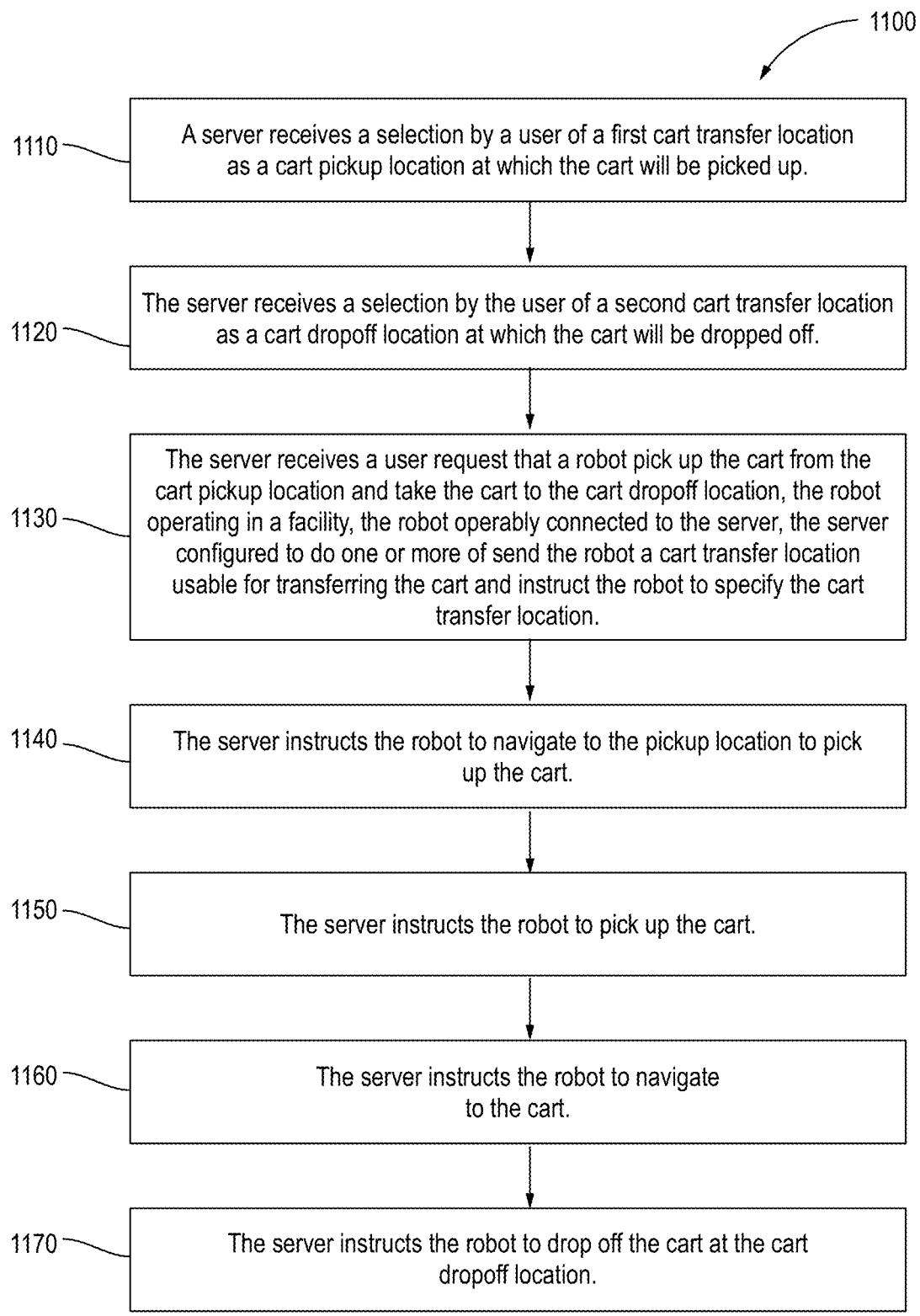

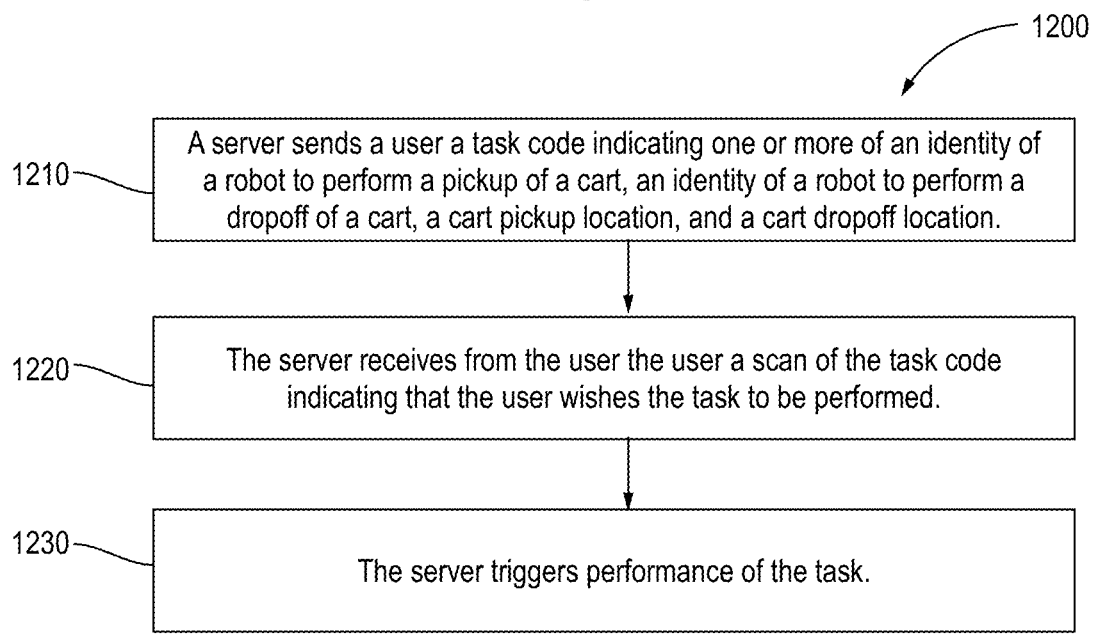

SYSTEM AND METHOD FOR ROBOT-ASSISTED, CART-BASED WORKFLOWS

PRIORITY CLAIM

The present application claims the priority benefit of U.S. provisional patent application No. 62/655,744 filed Apr. 10, 2018 and entitled "Graphic User Interface and Software for Robotic Management," and of U.S. provisional patent application No. 62/655,755 filed Apr. 10, 2018 and entitled "System and Method for Automatically Annotating a Map," the disclosures of which are incorporated herein by reference.

CROSS-REFERENCE TO RELATED APPLICATIONS

This application contains subject matter that is related to the subject matter of the following applications, which are assigned to the same assignee as this application. The below-listed applications are hereby incorporated herein by reference in its entirety:

"ROBOT MANAGEMENT SYSTEM," by Dymesich, et al., co-filed herewith.

"SYSTEM AND METHOD FOR AUTOMATICALLY ANNOTATING A MAP," by Avagyan, et al., co-filed herewith.

"ROBOTIC CART CONFIGURED FOR EFFECTIVE NAVIGATION AND MULTI-ORIENTATION DOCKING," by Diehr, et al., co-filed herewith.

SUMMARY

A cart-based workflow system includes: a robot operating in a facility; a server, the server operably connected to the robot, the server configured to do one or more of send the robot a cart transfer location usable for transferring the cart and instruct the robot to specify the cart transfer location; a graphic user interface (GUI) comprising a map of the facility, the GUI operably connected to the server, the GUI configured to do one or more of receive input from a human user and provide output to the human user, the GUI further configured to be usable by the user to coordinate movement of one or more of robots and carts.

A method includes: receiving, by a server, a selection by a user of a first cart transfer location as a cart pickup location at which the cart will be picked up; receiving, by the server, a selection by a user of a second cart transfer location as a cart dropoff location at which the cart will be dropped off; receiving, by the server, a user request that a robot pick up the cart from the cart pickup location and take the cart to the cart dropoff location, the robot operating in a facility, the robot operably connected to the server, the server configured to do one or more of send the robot a cart transfer location usable for transferring the cart and instruct the robot to specify the cart transfer location; instructing, by the server, to a robot, to navigate to the pickup location to pick up the cart; instructing, by the server, to the robot, to pick up the cart; instructing, by the server, to the robot, to navigate to the cart dropoff location; instructing, by the server, to the robot, to drop off the cart at the cart dropoff location; and instructing, by the server, to the robot, to detach from the cart.

A method includes: sending, by a server, to a user, a task code indicating one or more of an identity of a robot to perform a pickup of a cart, an identity of a robot to perform a dropoff of a cart, a cart pickup location, and a cart dropoff location; receiving, by the server, from the user, a scan of the task code indicating that the user wishes the task to be performed; and triggering, by the server, performance of the task.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 11 is a flow chart of a method for a robot-assisted cart-based workflow.

FIG. 12 is a flow chart of a method for a robot-assisted cart-based workflow.

DETAILED DESCRIPTION

Figure 1A:
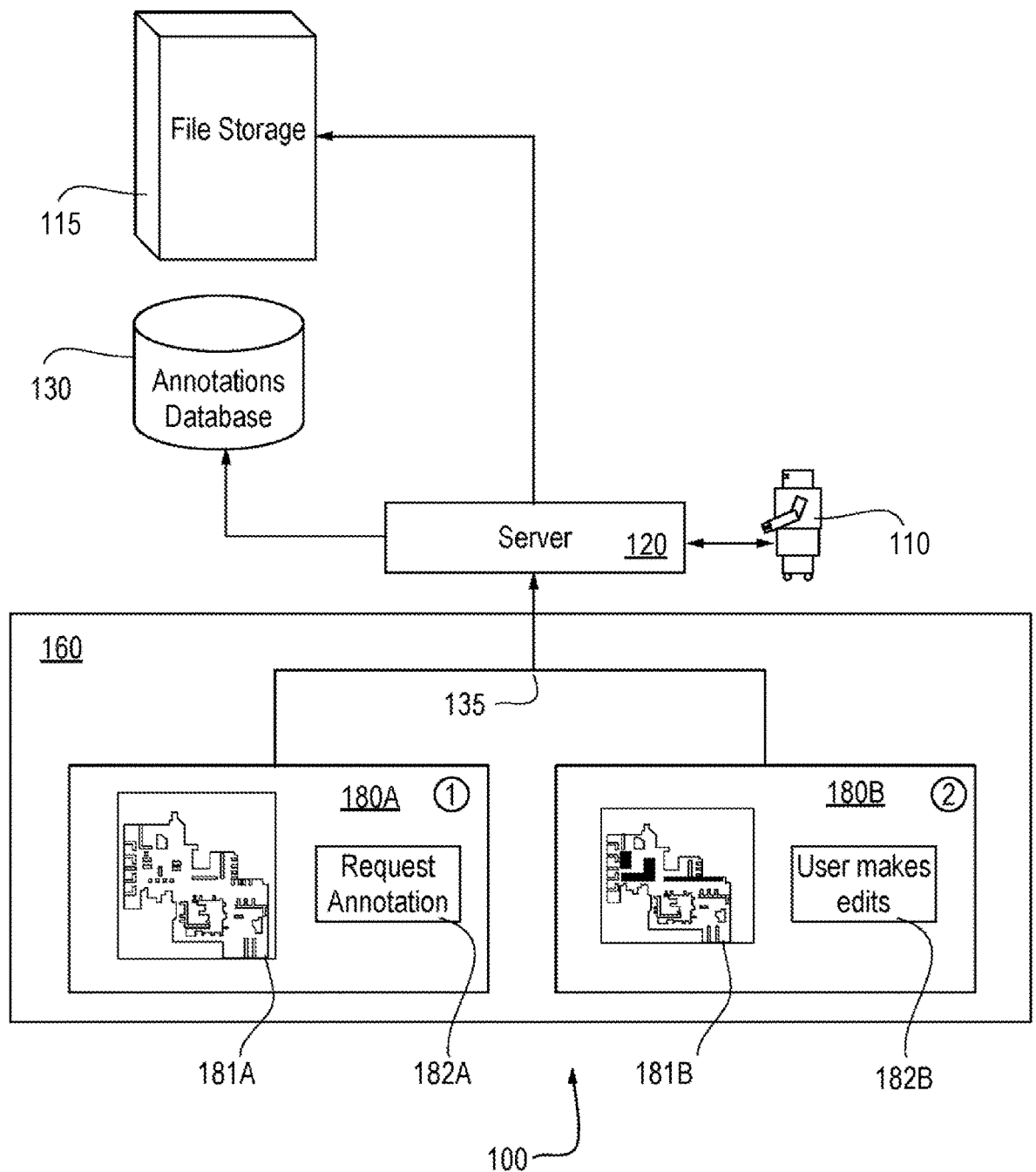
FIGS. 1A-1B are a pair of system diagrams for a system for robot-assisted cart-based workflows.

According to embodiments of the invention, a robot can connect to a cart comprising a payload to transfer one or more of the cart and the payload to a different location. Through its connection to one or more of a server and a graphic user interface (GUI), the robot (and a cart connected to the robot) can be controlled by a user to facilitate transporting material in warehouses or other environments. For example, the user can do one or more of schedule the robot and request the robot.

The robotic workflow can be complex. The robotic workflow can comprise the robot analyzing the payload of the cart. The robotic workflow can comprise transferring a cart to a location based on a code scanned by a human. A robots can transport a cart to a desired location. A purpose of transporting a cart comprises, for example, transporting one or more of material contained in the cart and goods contained in the cart. Another purpose of transporting a cart comprises transporting an empty cart to a location in order for the cart to be filled at the location.

The robots use a map of their environment to know where they are and to figure out how to get to locations in their environment. The same map is visible to users in a graphic user interface (GUI). Users annotate the map with cart transfer locations. These are locations where a robot can do one or more of pick up a cart and drop off a cart. For example, the cart transfer location comprises a cart transfer station. When creating a workflow, the locations for the robot to pick up and drop off carts will be defined on the map.

A robot drives to the location of a cart, attaches to and picks up the cart and then drives with the cart attached to the new location, where the robot detaches from the cart.

The process of the robot driving to the location of a cart and attaching to the cart is defined as the robot "picking up" the cart. Similarly, the process of the robot driving to a location while attached to the cart and then detaching from the cart at that location is defined as the robot "dropping off" the cart. Parts of the workflow performed by the robot, including 1) picking up a cart, 2) dropping off a cart and 3) navigating to different locations, are called tasks.

A cart-based workflow (also referred to here as just a workflow) is a process where a robot does one or more of pick up a cart as a specified location and drop off a cart at a specified location. Preferably, although not necessarily, the specified location comprises a cart transfer location. Where applicable, a workflow includes interactions between a human, for example, a human worker, and one or more of a cart, a robot and a cart-based workflow graphic user interface (GUI).

Cart-based workflows can be used to transfer materials to clean rooms from warehouse or other non-clean room environments. For example, between non-clean rooms and clean rooms there is often an air shower to ensure that people and materials entering the clean room do not contaminate the clean room. A robot can pick up a cart from the non-clean area and drop off the cart in the air shower. The first robot exits, the air shower. The air shower cleans the cart (and its contents) and a robot from the clean room then enters the air shower, attaches to the cart and brings it into the clean room.

In general, if a robot has certain characteristics that mean it needs to stay in a certain area, cart-based workflows allow it to transfer its cart (and payload) to a second robot that can take the cart to a different area.

Within these workflows, the robot can be additionally used to report information about the payload on the cart. For example, a radio-frequency identification (RFID) reader mounted on the robot can be used to verify that the cart contains the intended payload. For example, the robot can also work with carts whose payload is detachable from the cart itself, for example the cart consists of a frame with legs and wheels and the "shelves" of the cart are a tote that can be detached from the frame. In this case the worker could load the cart as usual or could detach the tote and load it before putting it back on the cart frame. Workers can also pick the actual totes from shelves, conveyors, and the like and load them onto carts. Then the robot that receives a request to pick up the cart drives the cart past an RFID reader configured to scan the contents of the cart. This information can be integrated into warehouse management systems.

According to embodiments of the invention, the robot is configured to analyze the payload of the cart.

Sensors on the robot could be used to estimate the weight of the payload on the cart and this information can also be integrated into warehouse management systems.

Another type of workflow is picking up and dropping off carts based on scanning a code corresponding to a task, for example a barcode or QR code or similar. These are scan-based cart-based workflows.

Figure 1B:
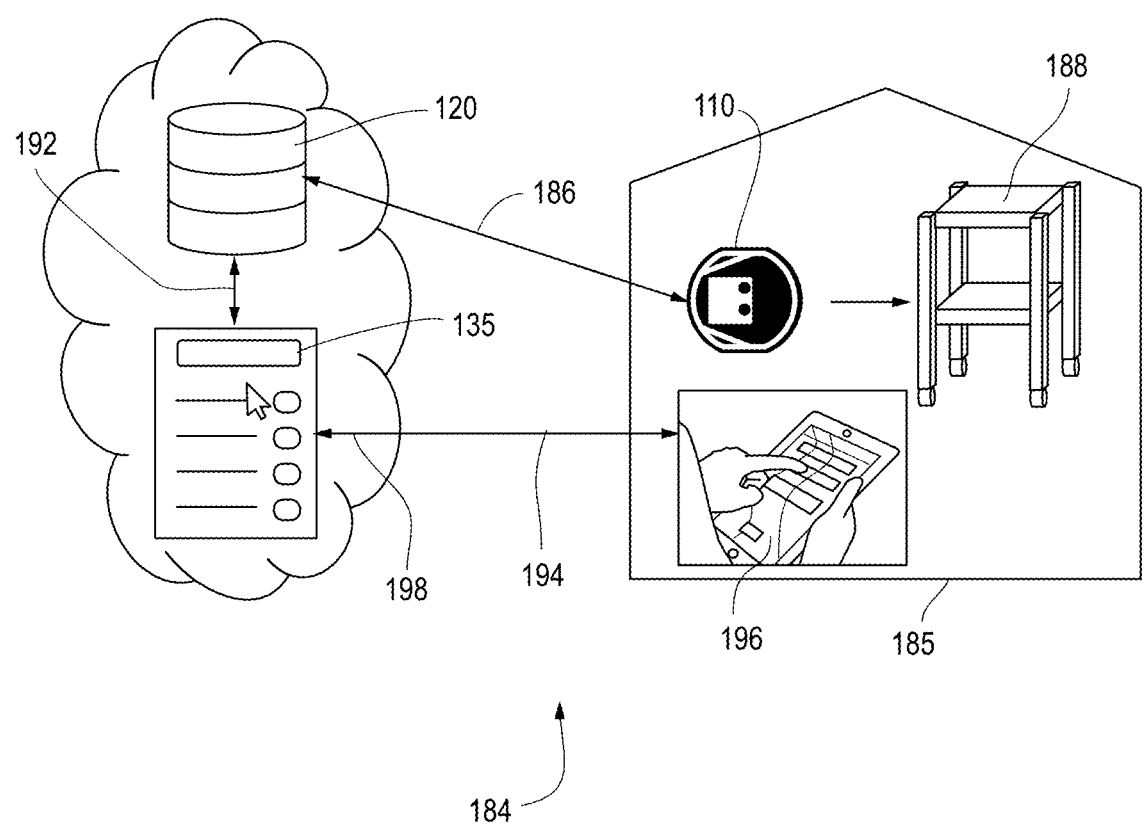

FIGS. 1A-1B are a pair of system diagrams for a system for robot-assisted cart-based workflows.

FIG. 1A is a system diagram for a system 100 for robot-assisted cart-based workflows, including a robot 110, file storage 115, a server 120, an annotations database 130, a graphic user interface (GUI) 135, and a computer 160. The robot 110 is operably connected to the server 120. The file storage 115 is operably connected to the server 120. For example, the server comprises an application programming interface (API) server. The server 120 is operably connected to the annotations database 130. The GUI 135 is usable by a human user (not shown in this figure). The GUI 135 is operably connected to the server 120. The server 120 is further operably connected to the computer 160.

Depicted are two screenshots of the GUI 135, a first GUI screenshot 180A and a second GUI screenshot 180B. In the first GUI screenshot 180A, the server receives from a user a map annotation of a feature of interest. In the second GUI screenshot 180B, the GUI presents the annotated map to the user, and the user is allowed to make any needed edits. The first GUI screenshot 180A comprises a first map 181A. The first GUI screenshot receives a first user input 182A, a user annotation of the first map 181A.

The system sends the request from the GUI 135 of the computer 160 to the server 120. The system receives an annotation from a human and modifies the map accordingly. The system then transmits an annotated map 181B to the server 120 and then to the computer 160, where it is displayed on the GUI 135 as a second map 181B in the second GUI screenshot 180B. The second GUI screenshot 180B further comprises a second user input 182B, allowing the user to enter optional edits of the second map 181B via the GUI 135 to the computer 160 for transmission to the server 120 and incorporation into the second map 181B.

FIG. 1B is a system diagram 184 for a system for robot-assisted cart-based workflows, showing an exemplary cart-based workflow. A customer facility 185 comprises a robot 110. The robot 110 is operably connected to the server 120 via a robot-server connection 186. For example, the robot-server connection 186 comprises a network connection. The customer facility 185 further comprises the cart 188. The server 120 may instruct the robot 110 to interact with the cart 188. For example, the server 120 may instruct the robot 110 to specify a cart transfer location for transferring the cart 188. For example, the cart transfer operation comprises one or more of a pickup of the cart 188 and a dropoff of the cart 188.

For example, the first user input (not shown in FIG. 1B; item 182A in FIG. 1A) comprises one or more of input from a user regarding where the robot 110 performs a cart transfer operation and a direction in which the robot 110 performs a cart transfer operation.

For example, through the robot-server connection 186, the server 120 gives the robot 110 locations at which to do one or more of pick up a cart 188 and drop off a cart 188. The graphic user interface (GUI) 135 is operably connected to the server 120 via a server-GUI connection 192. The GUI 135 comprises a map 181 of the facility 185.

The GUI 135 is configured to do one or more of receive input from a human user (not shown) and provide output to the human user. The GUI is further configured to receive an update from the user. For example, the update comprises one or more of a detected position of a cart 188 and a detected position of a robot 110. For example, the human user uses the GUI to coordinate movement of one or more of robots 110 and carts 188. For example, the server-GUI connection 192 comprises a network connection.

The GUI 135 is operably connected over a GUI-device connection 194 to a user device 196 usable by the user. Typically, although not necessarily, the GUI-device connection 192 comprises a network connection. The user device 196 is configured to do one or more of receive input from the user and provide output to the user. The customer facility 185 further comprises the user device 196. For example, the user device 196 comprises an Internet-connected user device. For example, the user device 196 comprises one or more of a tablet, a laptop computer, and a desktop computer.

One or more of the GUI 135 and the user device 196 receives updates from the user and then transmits the updates to the server 120 over the server-GUI connection 192. Alternatively, or additionally, the robot 110 transmits updates to the server 120 over the robot-server connection 186. The server 120 then forwards the updates to one or more of the GUI 135 and the user device 196 for display to the user.

Typically, although not necessarily, a cloud 198 comprises the server 120. For example, the user accesses the server 120 over the Internet. For example, the server 120 is hosted externally to the customer facility 185. Alternatively, the GUI 135 is hosted at the customer facility 185. Typically, although not necessarily, the cloud 198 comprises the GUI 135. For example, the user accesses the GUI 135 over the Internet. For example, the GUI 135 is hosted externally to the customer facility 108. Alternatively, the GUI 135 is hosted at the customer facility 185. It is also possible for the server 120 and GUI 135 to be hosted locally at a customer site.

When, using the GUI 135, the user requests that the robot 110 perform one or more of pick up a cart 188 and drop off the cart 188, the GUI 135 updates the server 120 over the server-GUI connection 192. When, using the user device 196, the user requests that the robot 110 perform one or more of pick up a cart 188 and drop off the cart 188, the user device 196 updates the server 120 over the server-GUI connection 192. The server 120 then sends to the robot 110 over the robot-server connection 186 an instruction to fulfill the request.

Figure 2A:
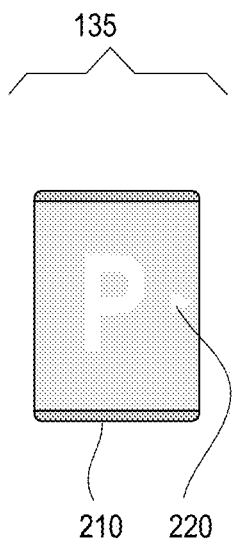
FIGS. 2A-2C are a set of figures showing screenshots of a GUI for a cart-based workflow including exemplary cart transfer icons.
Figure 2B:
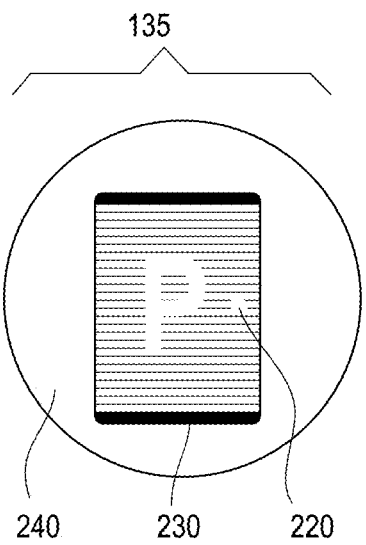
Figure 2C:
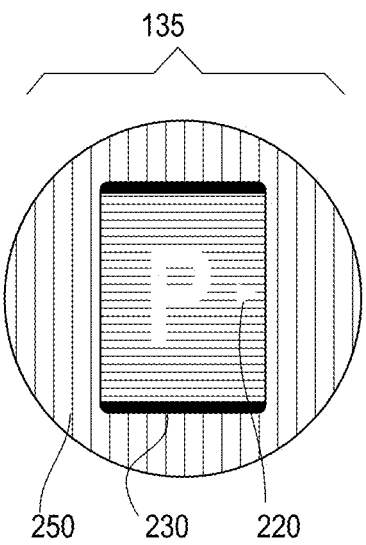

FIGS. 2A-2C are a set of figures showing screenshots of a GUI for a cart-based workflow including exemplary cart transfer icons. Using the GUI, the user annotates a map of the environment to define locations where the robot can do one or more of pick up a cart and drop off a cart. A location where the robot can do one or more of pick up a cart and drop off a cart is defined as a cart transfer location. The user annotates cart transfer locations with a cart transfer icon.

In FIG. 2A, the GUI 135 shows that a cart transfer location icon 210 is "whited out" because it has not been selected by the user. The cart transfer location icon 210 comprises an arrow 220 that indicates a direction from which the robot (not shown in this figure) will approach the cart (not shown in this figure).

In FIG. 2B, the GUI 135 shows that the cart transfer icon 230 is clearly visible after the user selects a cart transfer location. Additionally, after the user selects the location, the cart transfer icon 230 comprises a cart transfer circle 240. The cart transfer circle 240 highlights the cart transfer location. The cart transfer circle 240 appears without any crosshatching to indicate that the cart transfer location is safely distant from surrounding obstacles, for example, one or more of walls and shelves. The cart transfer icon again comprises the arrow 220.

In FIG. 2C, as shown by the GUI 135, the cart transfer icon 230 is again clearly visible and, after the user selects the location, the cart transfer icon 230 again comprises a circle 250. The circle 540 highlights the cart transfer location. The circle 250 appears with crosshatching to indicate that the cart transfer location is too close to a surrounding obstacle and is in danger of collision with the obstacle.

Figure 3A:
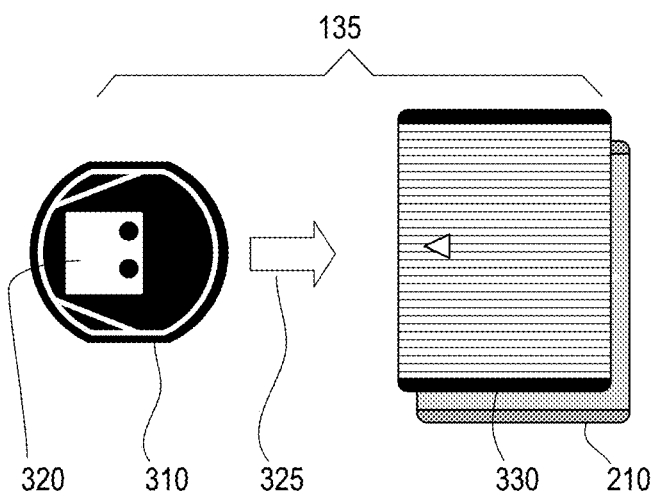
FIGS. 3A-3B are a set of figures showing screenshots of a GUI for a cart-based workflow including exemplary icons usable for monitoring the robot (robot itself not shown in this figure).
Figure 3B:
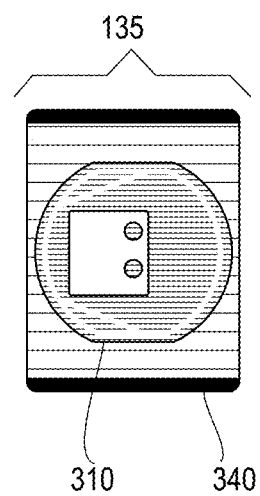

FIGS. 3A-3B are a set of figures showing screenshots of a GUI for a cart-based workflow including exemplary icons 310 usable for monitoring the robot (robot itself not shown in this figure).

In FIG. 3A, using the GUI 135, the user sees the robot icon 310 appear on a map (not shown in this figure) of an environment to indicate a current position of the robot (not shown in this figure). The robot icon 310 comprises a docking module icon 320 representing the docking module of the robot used for connecting to a cart (not shown in this figure).

When the robot detects a cart, as suggested by the arrow 325, a cart icon 330 appears on the map representing a detected location of the cart. As shown, the detected location can be slightly different than the cart transfer location 210 as defined on the map if the cart was placed at the location imprecisely.

In FIG. 3B, using the GUI 135, the user sees that when the robot connects with the cart, the robot icon 310 overlaps with a translucent cart icon 340. FIG. 3B thus shows a graphic and immediately comprehensible representation of the connection of the cart and the robot. This feature allows a user to see where a robot is and if it is currently connected to a cart.

FIGS. 4A-4E provide views of a facility map as seen by a user in the graphic user interface (GUI).

FIGS. 4A-4E show how a user can annotate the map. FIGS. 4A-4E further show icons used on the map that users see in the GUI.

Figure 4A:
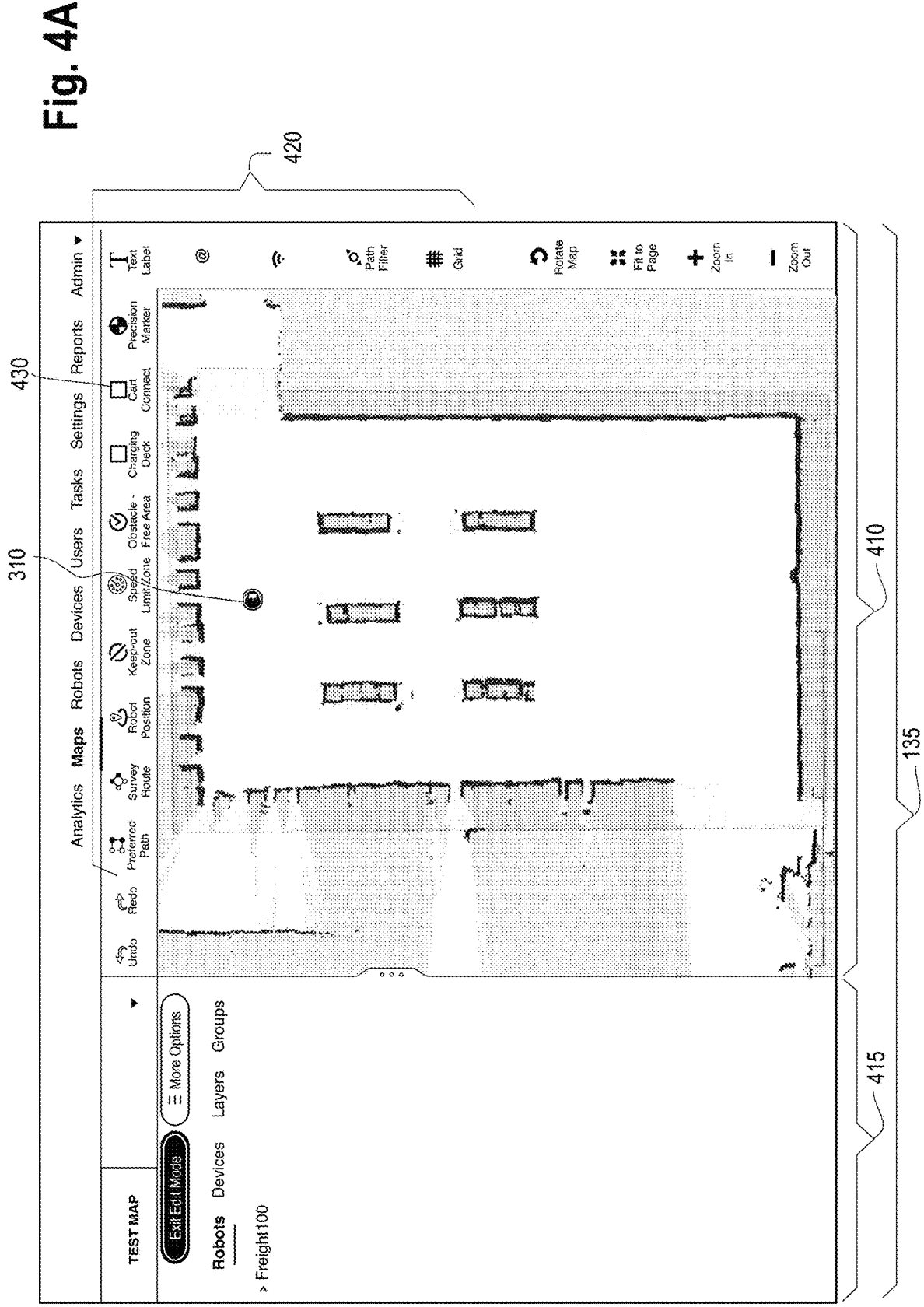
FIGS. 4A-4E provide views of a facility map as seen by a user in the graphic user interface (GUI).

FIG. 4A shows a user adding a cart transfer location to the map. FIG. 4A depicts a representative GUI 135 viewable by a user and comprising a facility map 181. The GUI 135 further comprises the robot icon 310. The GUI 135 further comprises a lefthand sidebar 415. The GUI 135 further comprises map annotation tools 420 that are selectable by the user to annotate the map 400. The map annotation tools 420 comprise a "Cart Transfer" tab 430. The map annotation tools 420 comprise a number of other tabs. The GUI 135 further comprises other features including a lefthand sidebar and further user selectable buttons menus along the right bottom side of the GUI 135. These features are discussed in more detail in the application titled "ROBOTIC MANAGEMENT SYSTEM AND GRAPHIC USER INTERFACE," by Dymesich, et al., co-filed herewith.

The GUI 135 does not show the carts on the map 181 because the carts do not typically comprise a computer configured to inform the server and thus the GUI 135 of the cart's location, and because the carts also do not typically comprise a sensor configured to inform the server and thus the GUI 135 of the cart's location. Carts are visible in the GUI 135 when the robot detects the cart (item 330 in FIG. 4E) or when a robot is attached to a cart as in FIG. 3B.

The user selects the "Cart Transfer" tab 430 from the map annotation tools 420 in order to add a cart transfer location to the map 181. As discussed in more detail in the application titled "ROBOTIC MANAGEMENT SYSTEM AND GRAPHIC USER INTERFACE," by Dymesich, et al., co-filed herewith, a cart transfer location is defined as a location designated by the user where a cart transfer robot can do one or more of pick up a cart and drop off a cart. For example, the cart transfer robot picks up a cart that comprises cargo. For example, the cart transfer robot picks up the cart at a first cart transfer location and drops off the cart at a second cart transfer location. For example, the cart transfer robots comprise all robots. For example, the cart transfer robots comprise a subset of robots. For example, the cart transfer robots comprise a user-designated robot subset.

A user annotates the map 181 using the cart transfer locations 210 discussed in FIG. 2, allowing the robot to do one or more of pick up a cart and drop off a cart. The robot uses the map 181 of the environment to do one or more of specify its own location and determine how to navigate to a destination in the environment. The same map 181 is visible to users in the GUI 135.

Figure 4B:
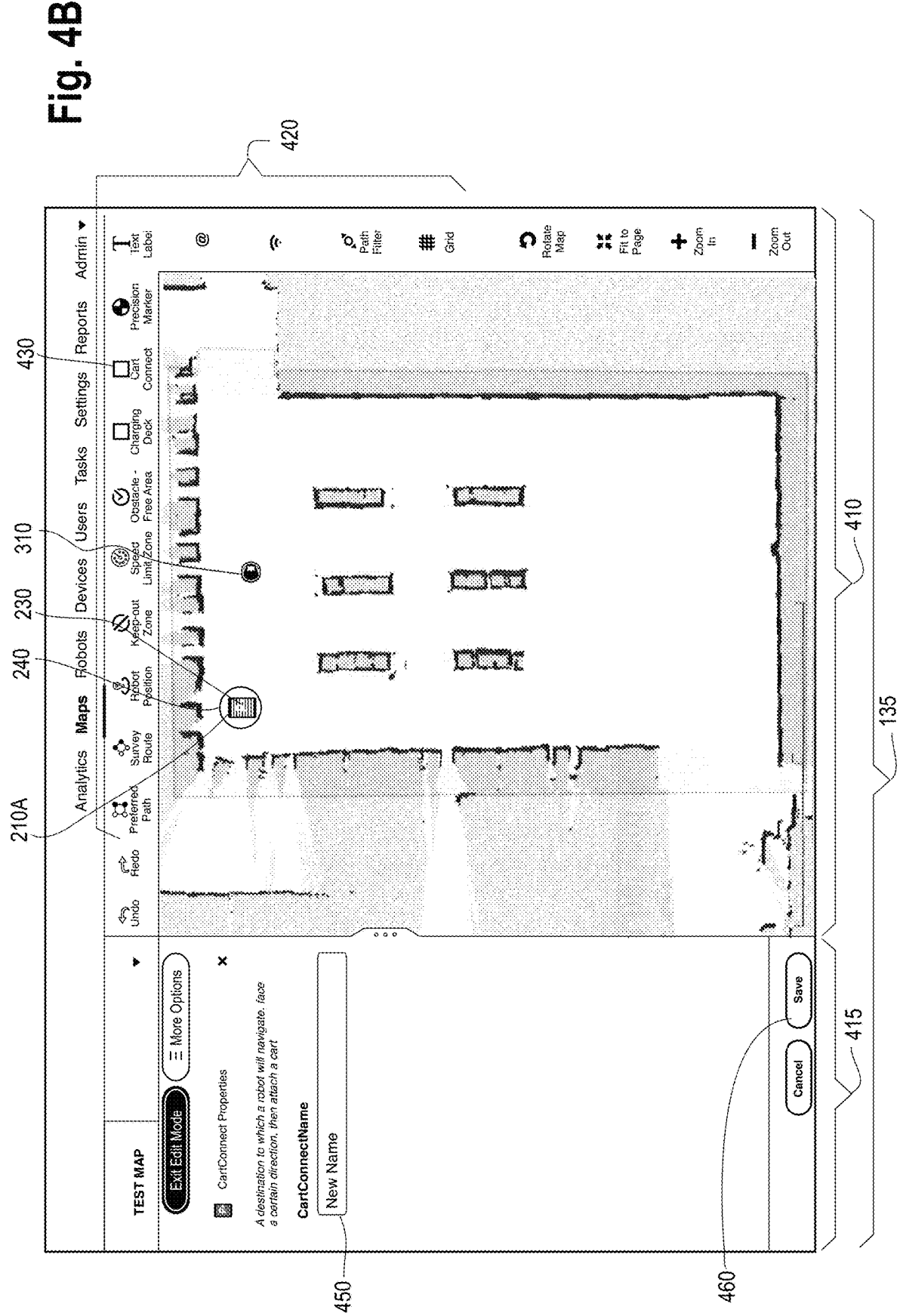

FIG. 4B shows the user positioning the cart transfer icon 230 in a first cart transfer location 210A desired by the user on the map 181 displayed by the GUI 135. Shown again are the robot icons 310 and the "Cart Transfer" tab 430. Also shown is the cart transfer circle 240.

To position the cart transfer icon 230, the user selects the desired first cart transfer location 210A. The system then displays the cart transfer icon 230 in the selected first cart transfer location 210A on the GUI 135. The system also displays in the left-hand sidebar 415 on the GUI 135 a "Cart Transfer Name" box 450 and a "Save" button 460. The user enters a name for the first cart transfer location 210A using the "Cart Transfer Name" box 450. The user saves the selected name for the first cart transfer location 210 using the "Save" button 460. When the user needs to select the cart transfer location 210A-210B where the robot is to do one or more of pick up a cart and drop off a cart, the user can use the selected names given to the cart transfer locations 210A-210B using the "Cart Transfer Name" box 450.

Figure 4C:
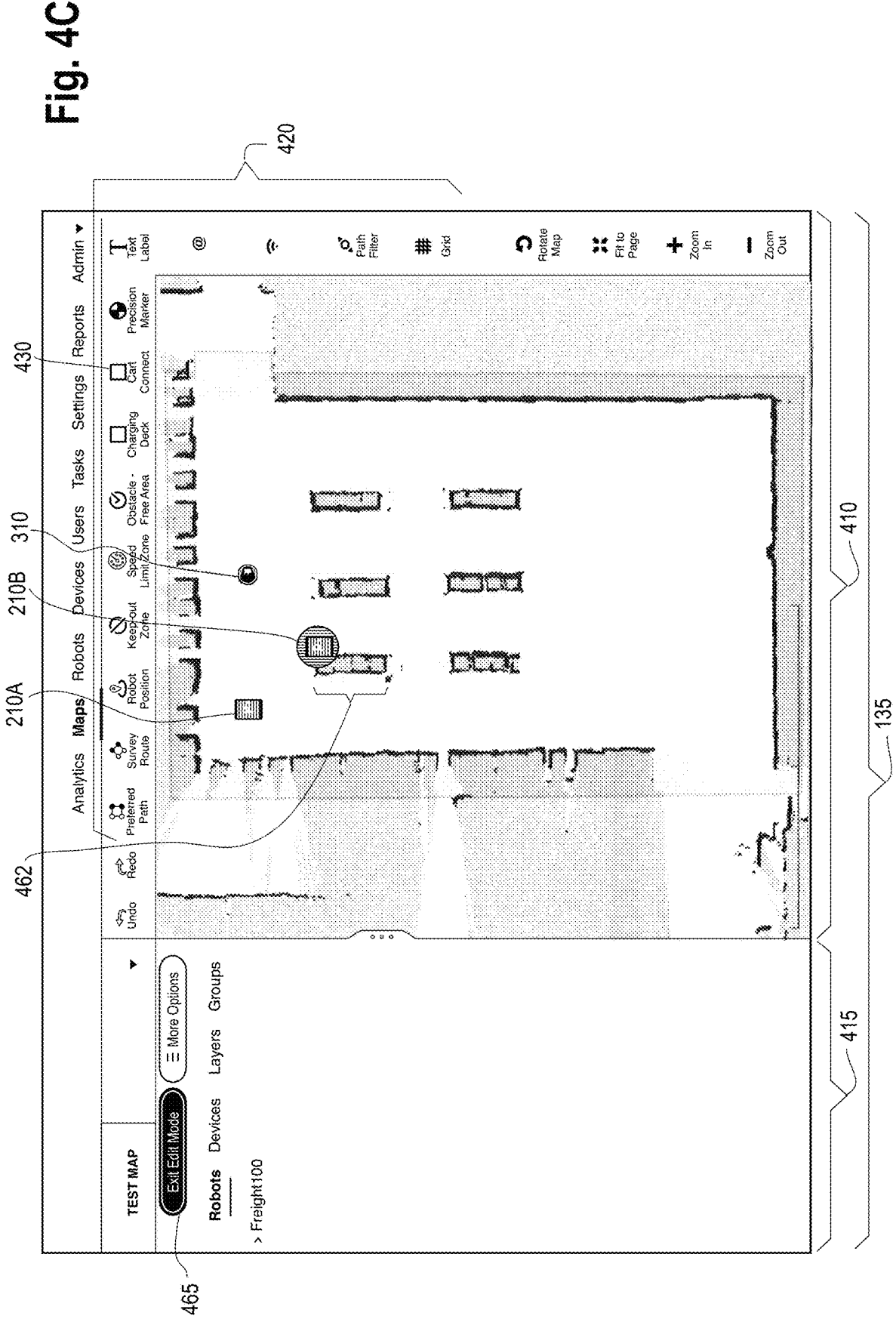

FIG. 4C shows what happens if a user places a second cart transfer location 210B so that it is in collision with some part of the environment. The second cart transfer location 210B is in collision with the obstacle 462 because the second cart transfer location 210B is so close to the obstacle 462 that the robot cannot do one or more of pick up a cart and drop off a cart there. Shown again are the first cart transfer location 210A, the robot icon 310, the GUI 135, the map 181, the left-hand sidebar 415, and the "Cart Transfer" tab 430. The map 181 further comprises an obstacle 462. The left-hand sidebar 415 comprises an "Exit Edit Mode" button 465. For example, the obstacle 462 comprises a shelf. When the user is finished adding annotations to the map 181, the user can press the "Exit Edit Mode" button 465.

Figure 4D:
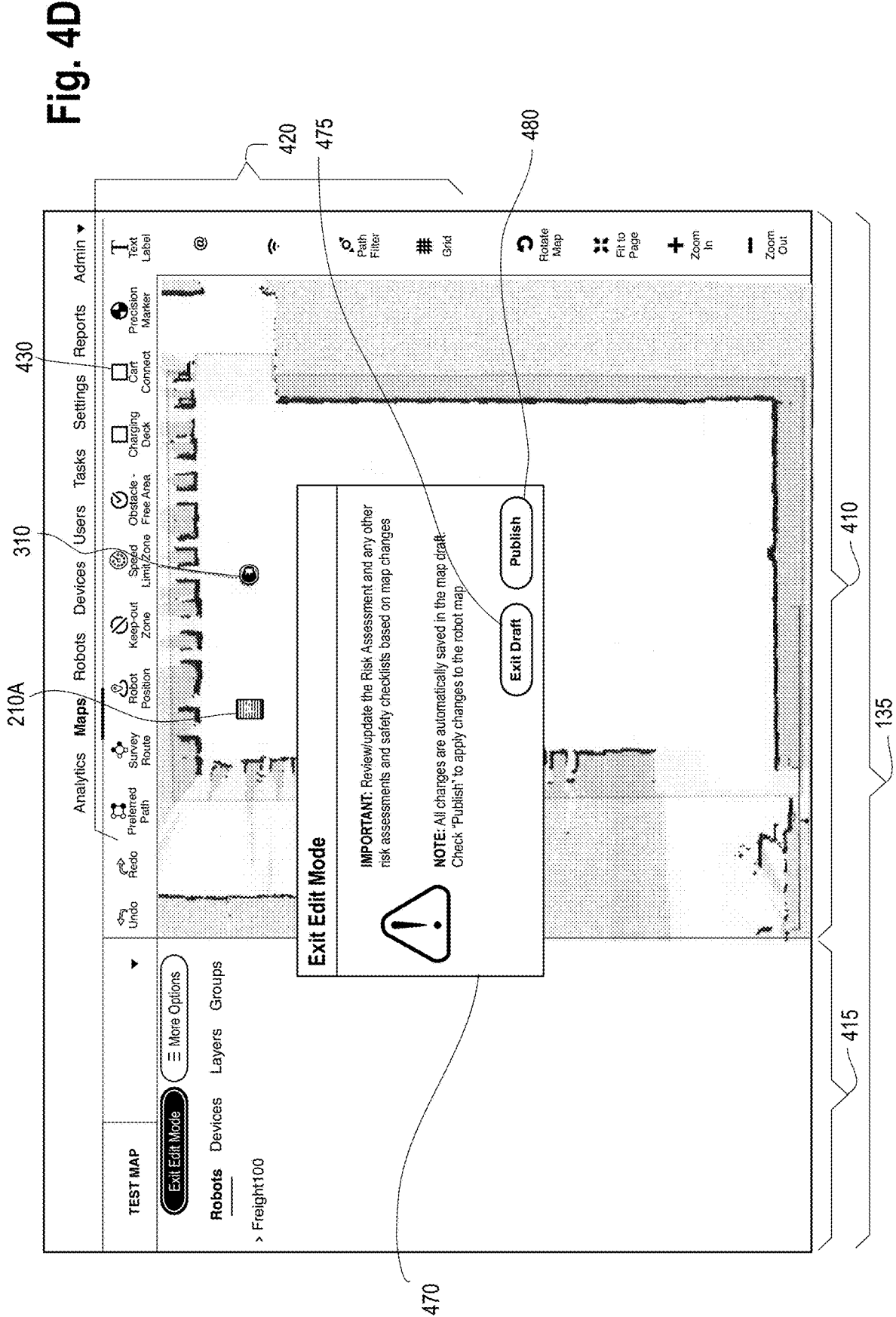

FIG. 4D shows user options after exiting edit mode in FIG. 4C. Shown again are the first cart transfer location 210A, the robot icon 310, the GUI 135, the map 181, the left-hand sidebar 415, and the "Cart Transfer" tab 430. The map further comprises an "Exit Edit Mode" popup 470 that the system displays following the user's press of the "Exit Edit Mode" button 465 in FIG. 4C.

As shown, for example, the "Exit Edit Mode" popup 470 comprises a warning icon 471 on the left hand side of the "Exit Edit Mode" popup 470. As shown, for example, the "Exit Edit Mode" popup 470 further comprises a text legend 473. As shown, for example, the text legend 473 comprises the words: "IMPORTANT: Review/update the Risk Assessment and any other risk assessments and safety checklists based on map changes. NOTE: All changes are automatically saved in the map draft. Click "Publish" to apply changes to the robot map." The "Exit Edit Mode" popup 470 further comprises an "Exit Draft" button 475 configured, if the user selects it, to exit from edit mode without saving the user's map draft. The "Exit Edit Mode" popup 470 further comprises a "Publish" button 480 configured, if the user selects it, to save the user's map draft including the user's map annotations.

Figure 4E:
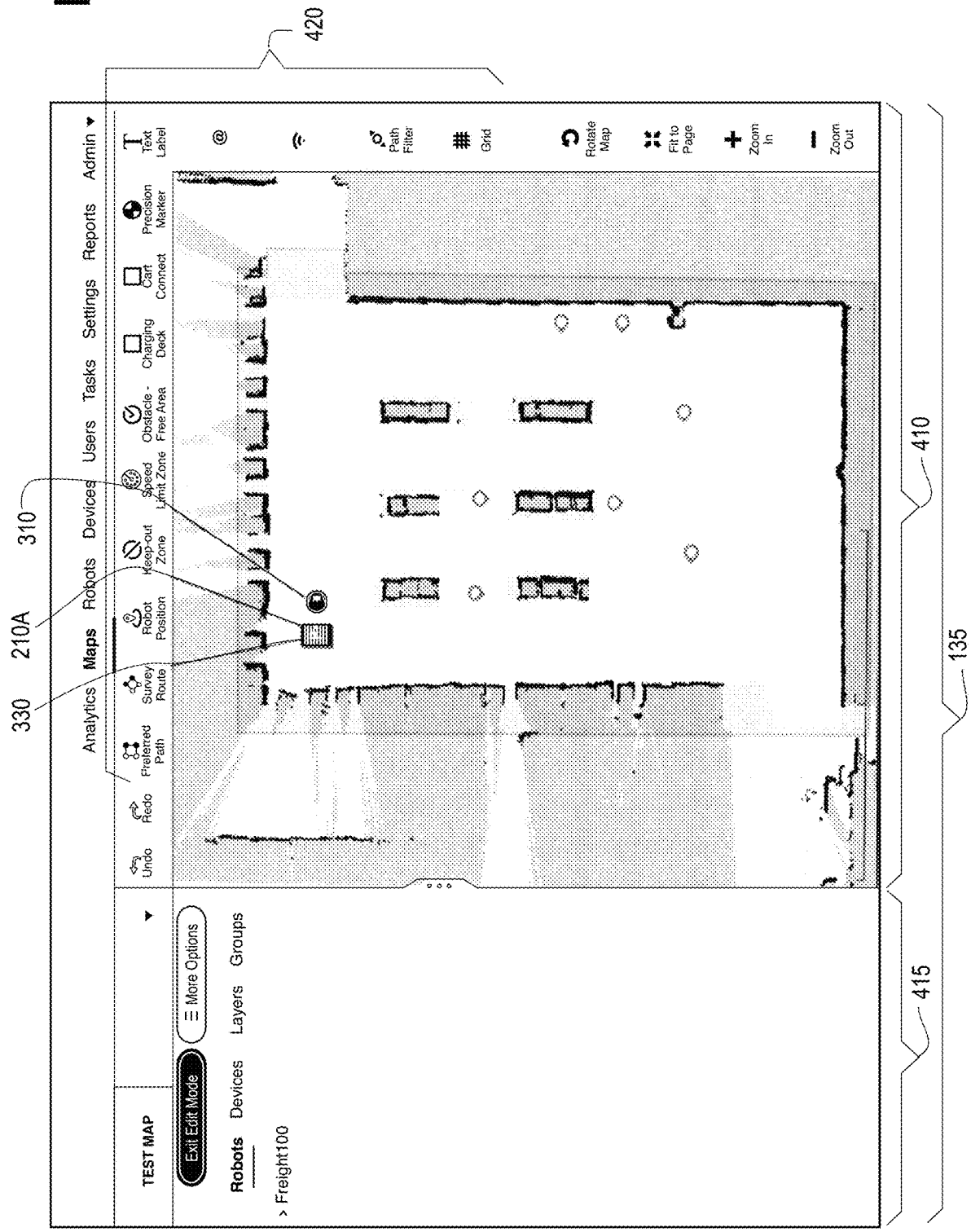

FIG. 4E shows a map 181 in which the robot icon 310 approaches the first cart transfer location 210A. The system updates the GUI 135 to show the actual location 330 where the robot detects the cart. Also shown again are the left-hand sidebar 415.

In FIG. 4E, the robot detects the cart at the first cart transfer location 210A. The system displays the cart icon 330 on the map 181 to show the actual detected position of the cart. Shown again is the robot icon 310.

FIGS. 5A-5H are a series of drawings illustrating an example of a basic cart-based workflow. The system facilitates many workflows for material transport.

Figure 5A:
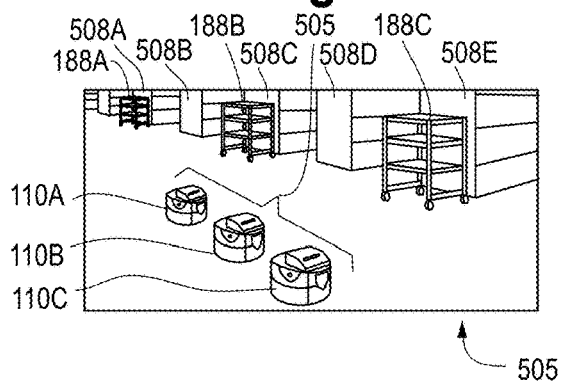
FIGS. 5A-5H are a series of drawings illustrating an example of a basic cart-based workflow. The system facilitates many workflows for material transport.

In FIG. 5A, robots 110A-110C wait in a "staging" line in a staging area 505 until they are needed to move a cart. The staging area 505 comprises shelves 508A, 508B, 508C, 508D and 508E. The shelves 580A-508E are configured to hold inventory items. Carts 188A-188C are shown at various cart locations.

Figure 5B:
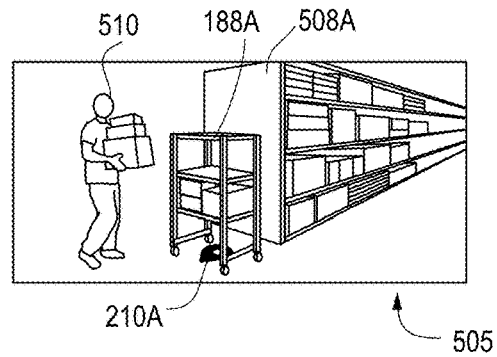

In FIG. 5B, a human worker 510 loads a cart 188A and leaves it at a first cart transfer location 210A. Also shown again are the first cart 188A and the staging area 505.

Figure 5C:
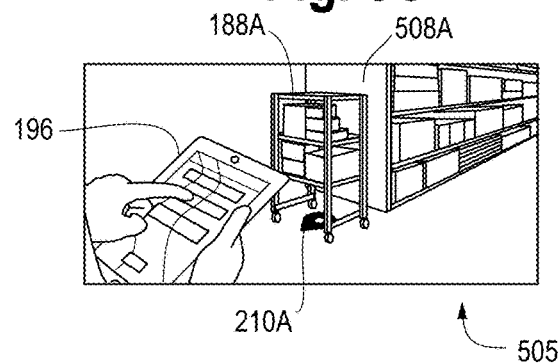

In FIG. 5C, the human 510 uses a tablet 196 to select the first cart transfer location 210A as a cart pickup location 210A at which the cart will be picked up. Also shown again is the first cart 188A. The human 510 uses the tablet 196 to select a second cart transfer location (not shown in this figure; item 210B in FIGS. 5F and 5G) as a cart dropoff location (not shown in this figure; item 210B in FIGS. 5F and 5G) at which to drop off the cart. The worker uses the tablet 196 to enter a request that the first robot 110A pick up the cart from the cart pickup location 210A and take the cart to the cart dropoff location 210B. Also shown again is the staging area 505.

Figure 5D:
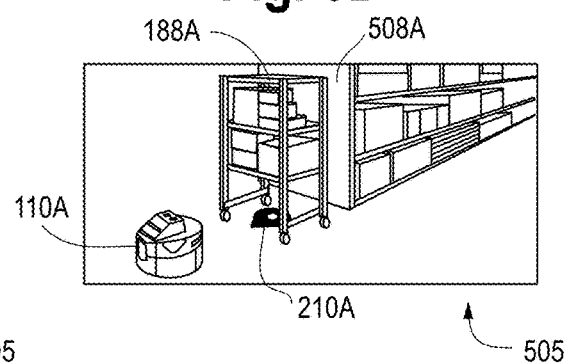

In FIG. 5D, a first robot 110A navigates to the pickup location 210A to pick up the cart 188A. Also shown again are the first cart 188A and the staging area 505.

Figure 5E:
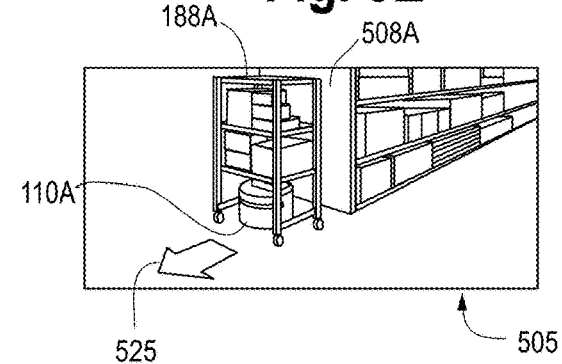

In FIG. 5E, the first robot 110A picks up the cart 188A and starts to move in a direction indicated by arrow 525 to navigate to the cart dropoff location 210B. Also shown again are the first cart 188A and the staging area 505.

Figure 5F:
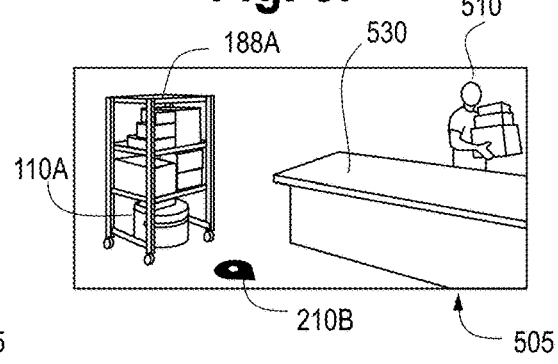

In FIG. 5F, the first robot 110A arrives with the cart 188A attached at the dropoff location 210B. Also shown is a bin 530 configured to hold inventory items. Shown again are the staging area 505 and the human 510.

Figure 5G:
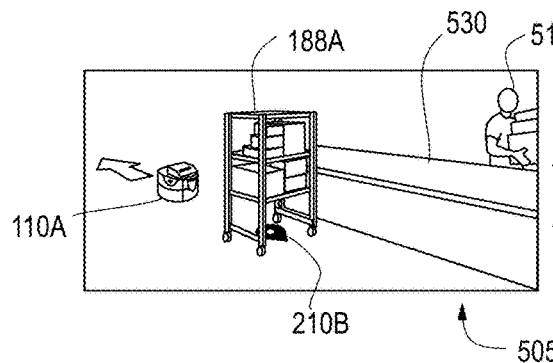

In FIG. 5G, the first robot 110A detaches from the cart 188A at the dropoff location 210B. Shown again are the staging area 505, the human 510 and the bin 530.

Figure 5H:
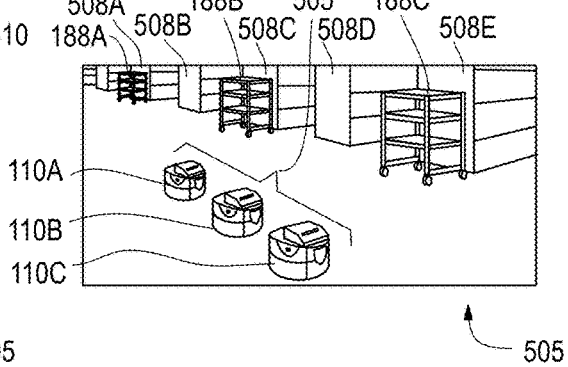

In FIG. 5H, the first robot 110A will return to the staging area 505 to wait for further instruction from the server. The staging area 505 again comprises the shelves 508A, 508B, 508C, 508D and 508E. Also shown again are the second robot 110б and the third robot 110C. The return to the staging area 505 can also be scheduled so that the first robot 110A can pick up carts from locations at certain times.

A similar workflow to that shown in FIGS. 5A-5H can be used to have the robots replenish the supply of empty carts for human workers to fill. A worker can request that the robot pick up an empty cart from a cart transfer location and bring it to a location near the worker. These tasks can be scheduled as well such that the robot automatically brings empty carts to locations at certain times.

FIGS. 6A-6G are a series of drawings illustrating an example of a basic cart-based workflow using carts and robots in conjunction with a forklift.

Figure 6A:
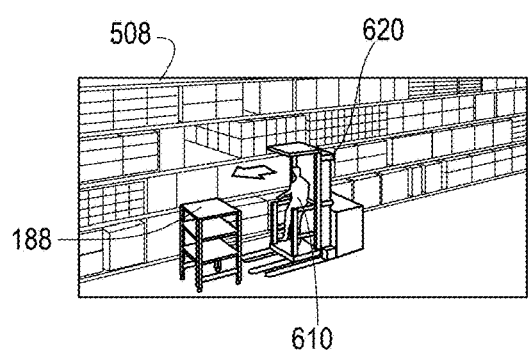
FIGS. 6A-6G are a series of drawings illustrating an example of a basic cart-based workflow using carts and robots in conjunction with a forklift.

In FIG. 6A, a human forklift operator 610 inserts tines of a forklift 620 into special sleeves in a cart 188. Also shown is a shelf 508 configured to hold inventory items.

Figure 6B:
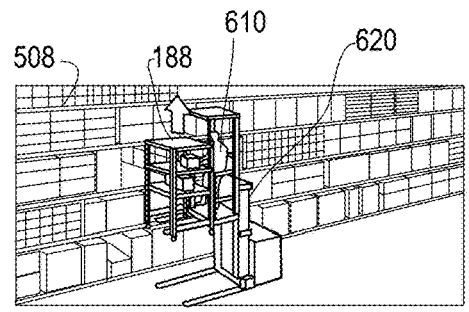

In FIG. 6B, the forklift operator 610 uses the forklift 620 to lift the cart 188 to a convenient height and load it. Shown again is the shelf 508. The cart is designed to be one or more of easily and safely lifted by a forklift.

Figure 6C:
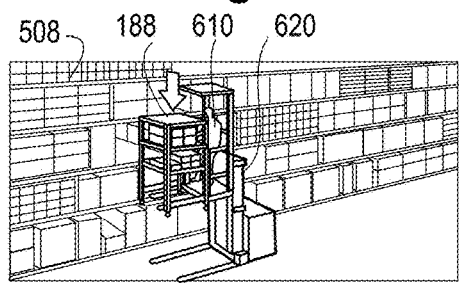

In FIG. 6C, once the cart 188 is loaded, the operator 610 uses the forklift 620 to lower the cart 188 back to the ground. Shown again is the shelf 508.

Figure 6D:
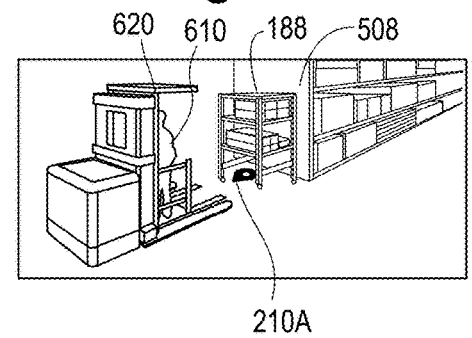

In FIG. 6D, the operator 610 drives the forklift 620 with the cart 188 attached to a first cart transfer location 210A and places the cart 188 there. Shown again is the shelf 508.

Figure 6E:
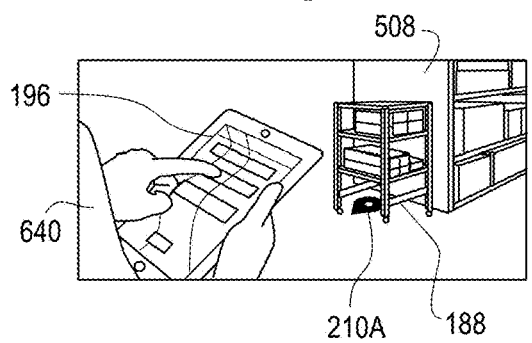

In FIG. 6E, a human worker 640 uses a tablet 196 to request that a robot (not shown in this figure; shown in FIG. 6F) pick up the cart 188 from the first cart transfer location 210A. Shown again is the shelf 508.

Figure 6F:
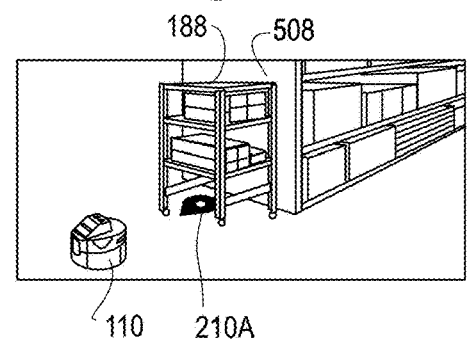

In FIG. 6F, a robot 110 picks up the cart 188 from the first cart transfer location 210A. Shown again is the shelf 508.

Figure 6G:
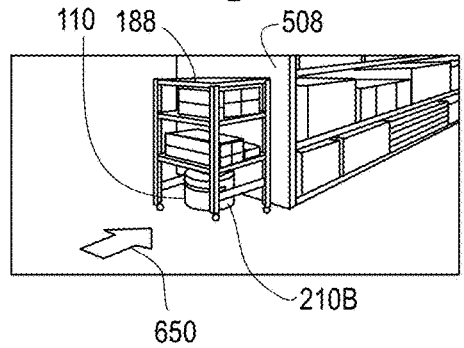

In FIG. 6G, the robot 110 moves in a direction indicated by arrow 650 and drops off the cart 188 at a second cart transfer location 210B. Shown again is the shelf 508.

Figure 7A:
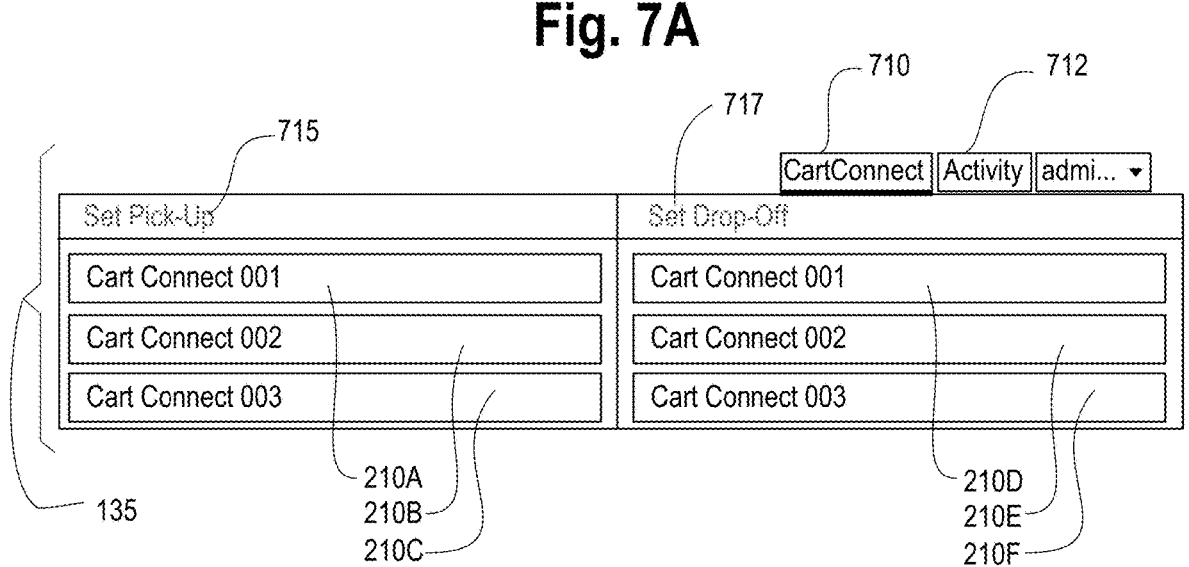
FIGS. 7A-7C are a series of drawings showing a GUI a user can use to request that a robot do one or more of pick up a cart from a cart transfer location and drop a cart off at a cart transfer location.
Figure 7B:
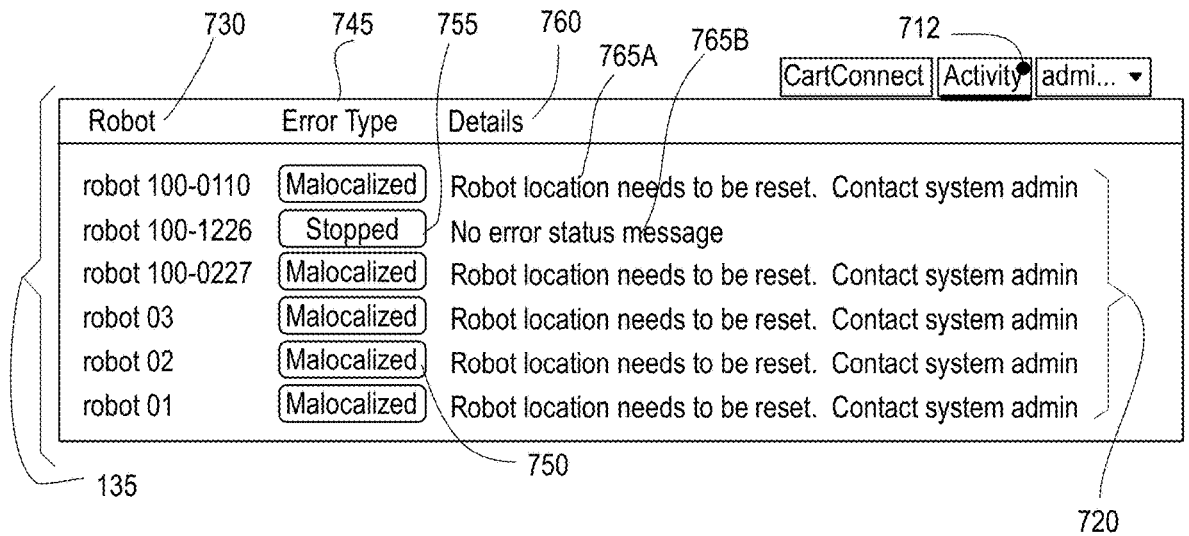
Figure 7C:
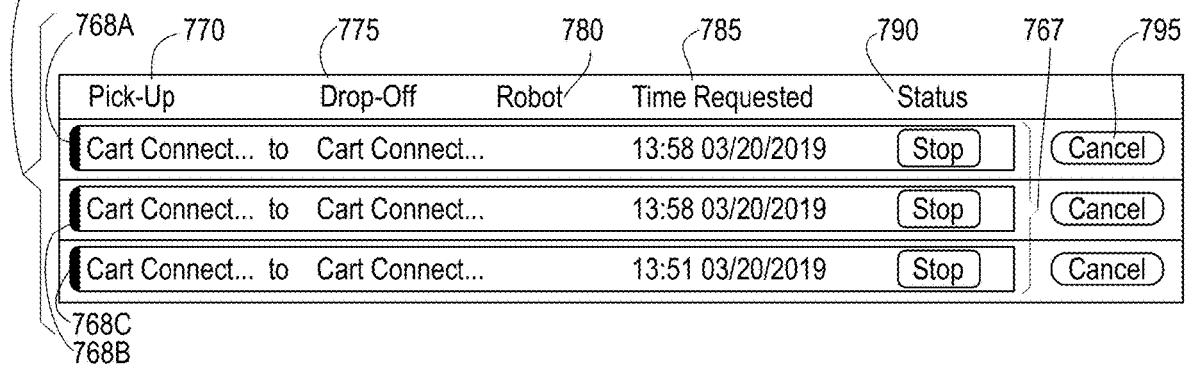

FIGS. 7A-7C are a series of drawings showing a GUI a user can use to request that a robot do one or more of pick up a cart from a cart transfer location and drop a cart off at a cart transfer location.

FIG. 7A shows a GUI 135 usable by a user (not shown in this figure) to request that a robot (not shown in this figure) to do one more of pick up a cart (not shown in this figure) at a cart transfer location 210 and drop off a cart at a cart transfer location 210. The GUI 135 comprises a cart transfer section 710 and an Activity section 712. If the user selects the cart transfer section 710, for example, by hovering a mouse over the cart transfer section 710, the cart transfer section 710 displays a cart pickup location list 715 and a cart dropoff location list 717. The cart pickup location list 715 comprises a list of cart transfer locations 210A-210C. The cart dropoff location list 717 comprises a list of cart transfer locations 210D-210F. The user selects the cart transfer location 210E from which the robot will pick up the cart.

FIG. 7B shows the Activity section 712 of the GUI 135. If the user selects the Activity section 712, for example, by hovering a mouse over the Activity section 712, the Activity section 712 displays a robot status listing 720. For example, the robot status listing 720 comprises information on robot activity allowing the user to monitor the status of robots. The robot status listing 720 comprises a robot listing 730 listing the active robots. The robot status listing 720 further comprises an error type 745. For example, the error type comprises "Mislocalized" 750. For example, the error type comprises "Stopped" 755. The robot status listing 720 further comprises details 760. Details comprise a first detail 765A and a second detail 765B. For example, the first detail 765A comprises the text, "Robot location needs to be reset. Contact system admin." For example, the second detail 765B comprises the text, "No error status message."

For example, the user can monitor the status of the robots using the robot status listing 720 to verify if a robot needs assistance. For example, a robot needing assistance may be stuck between obstacles. For example, a robot needing assistance may be unsure of its location. Examples of types of errors shown here are "Mislocalized" 750, which means the robot does not know where it is (either because the robot has not yet been initialized with a location or because the robot has gotten lost), and "Stopped" 755, which means someone has pressed the emergency stop button on the robot so it cannot move.

FIG. 7C shows a current status listing 767 of cart-based tasks that the user has requested. The GUI 135 comprises the current status listing 767 on the same page that comprises the Activity section 712 discussed in FIG. 7B. The current status listing 767 comprises an entry for each active task. As shown, the current status listing 767 comprises active tasks 768A-768C. The current status listing 767 comprises pickup locations 770 and dropoff locations 775 for each of the active tasks 768A-768C. The current status listing 767 further comprises for each of the active tasks 768A-768C a requested robot 780, a task request time 785, and a task status 790. The current status listing 767 further comprises cancel buttons 785 the user can press to cancel an active task 768A-768C.

FIGS. 8A-8D are a series of drawings showing a mobile phone screen GUI a user can use to associate a code with a robot picking up a cart from a certain location and dropping it off in another specified location.

Figure 8A:
FIGS. 8A-8D are a series of drawings showing a mobile phone screen GUI a user can use to associate a code with a robot picking up a cart from a certain location and dropping it off in another specified location.

FIG. 8A shows a code 810. For example, the code comprises one or more of a QR code, a bar code, and another scannable code. As depicted, the code 810 comprises a barcode. The code 810 comprises code text 815 associated with a workflow. For example, the code 810 triggers the robot (not shown in this figure) to pick up a cart (not shown in this figure). As depicted, the code text 815 comprises text "CART1234". When the user (not shown in this figure) wants the robot to complete a task that is part of the workflow, the user scans the code 810. For example, the user scans the code 810 using a scanner (not shown in this figure). For example, the scanner comprises one or more of a mobile phone scanner app and a scan gun. For example, one or more of the system and the user placed the code 810 close to the cart transfer location so that the user can place the cart at the cart transfer location and then scan the code 810 in order to have the robot complete its task.

Figure 8B:
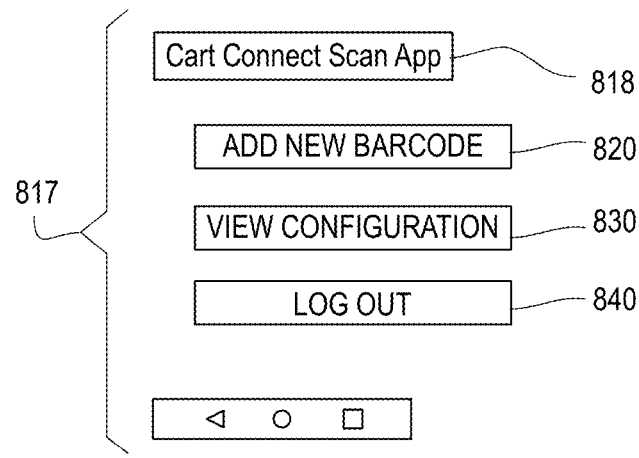
Figure 8C:
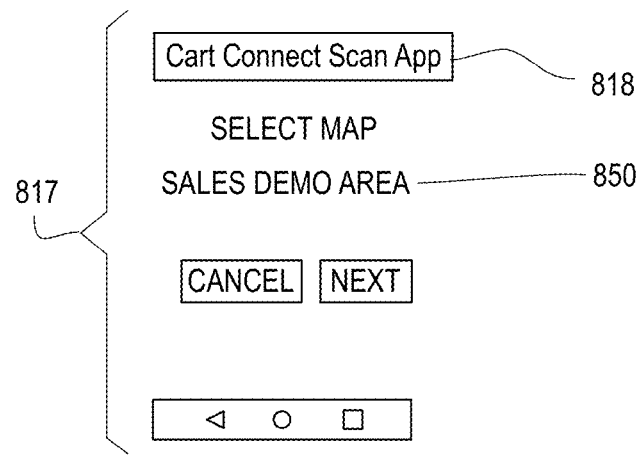
Figure 8D:
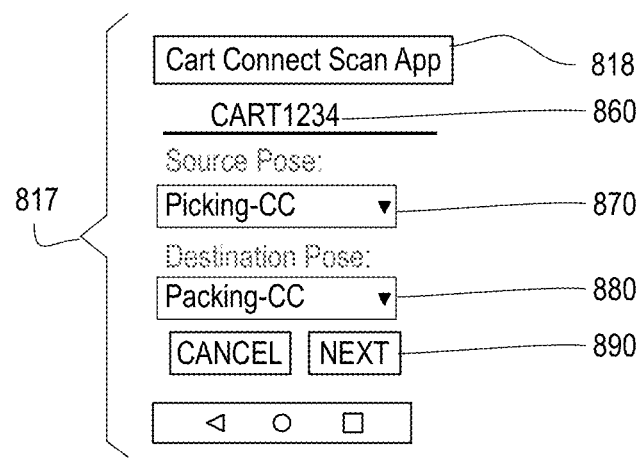

FIG. 8B shows a mobile phone GUI 817. The phone GUI 817 comprises a starting screen for a mobile phone app for a user to instruct a robot to do one or more of pick up a cart and drop off a cart using a code 810. The phone GUI 817 comprises a "Cart Connect Scan App" legend 818. The user uses the phone GUI 817 pursuant to a cart-based workflow. The phone GUI comprises an "Add New Barcode" button 820 selectable by a user to add a new code 810 and thereby create a new workflow, a "View Configuration" button 830 selectable by a user wishing to view a system configuration, and a "Log Out" button 840 selectable by a user wishing to log out of the system.

FIG. 8C again shows the mobile phone GUI 817. The mobile phone GUI 817 again comprises the "Cart Connect Scan App" legend 818. The phone GUI 817 further comprises a map selection button 850 selectable by the user to choose a name of the map (not shown in this figure) associated with the workflow being created.

FIG. 8D again shows the mobile phone GUI 817. The mobile phone GUI 817 again comprises the "Cart Connect Scan App" legend 818. Now that the user has selected the map in FIG. 8C, the mobile phone GUI 817 comprises a text input box 860 available to the user to input text represented by the code 810 that they user wants to associate with the workflow. For example a user wishing to scan the code 810 comprising the legend "CART1234" enters this text in the text input box 860.

The mobile phone GUI 817 further comprises a cart pickup location text box 870 available to the user to input text specifying a cart transfer location at which the robot can pick up a cart.

The mobile phone GUI 817 further comprises a cart dropoff location text box 880 available to the user to input text specifying a cart transfer location at which the robot can drop off a cart.

The mobile phone GUI 817 further comprises a "Save" button 890 selectable by the user to send information about the workflow to the server (not shown in this figure) so that when a code 810 is scanned, the desired robot behavior will be triggered.

FIGS. 9A-9G are a series of drawings illustrating an example of a user associating a code with a robot picking up a cart from a first cart transfer location 210A and dropping the cart off at a second cart transfer location 2106.

Figure 9A:
FIGS. 9A-9G are a series of drawings illustrating an example of a user associating a code with a robot picking up a cart from a first cart transfer location and dropping the cart off at a second cart transfer location.

In FIG. 9A, the robot 310 is idle and is located at an arbitrary robot location 910. The location does not necessarily comprise a cart transfer location 210A, also shown in the figure.

Figure 9B:
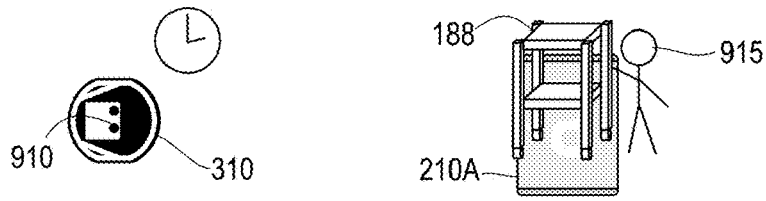

In FIG. 9B, a human worker 915 places a cart 188 at the first cart transfer location 210A. The robot 310 remains idle and standing by at the robot location 910.

Figure 9C:
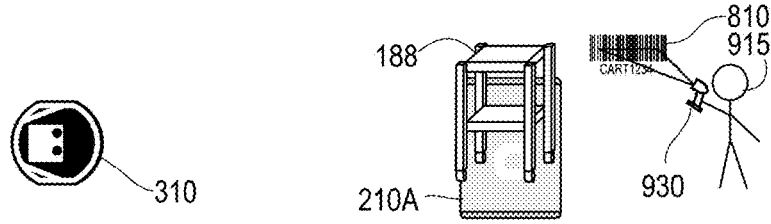

In FIG. 9C, the human 915 scans a code 810 using scanner 930. The scanner 930 comprises one or more of a mobile phone scanner app and a scan gun. The scanning of the code 810 triggers the robot 310 to pick up the cart 188 at the first cart transfer location 210A. The scanner 930 sends information to the server that the code 810 has been scanned, and the server then triggers the appropriate robot task.

Figure 9D:
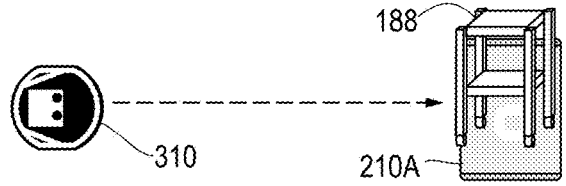

In FIG. 9D, the robot 310 navigates to the first cart transfer location 210A. The first cart transfer location 210A comprises a cart pickup location.

Figure 9E:
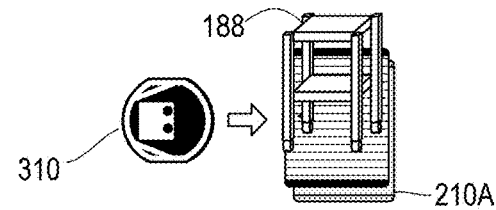

In FIG. 9E, the robot detects the cart 188 at the first cart transfer location 210A.

Figure 9F:
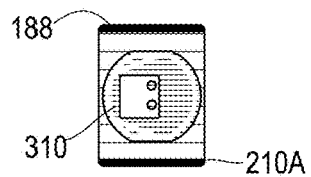

In FIG. 9F, the robot 310 picks up the cart 188 at the first cart transfer location 210A.

Figure 9G:
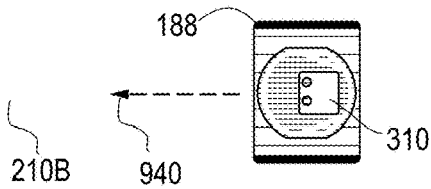

In FIG. 9G, the robot 310 navigates while carrying the attached cart 188 in a direction indicated by arrow 940 to the cart dropoff location 210B. The second cart transfer location 210B comprises a cart dropoff location.

These scan-based workflows can be used in multiple ways. Described above is one way to use code scanning in workflows. The example above is a simple example where the robot is not on any schedule and the start state of the robot is not necessarily controlled. The robot simply waits to receive instructions from the server. Triggering the robot using a scanner can also be used within more complex robot workflows. Users can also schedule cart-based workflows to happen at certain times or time intervals.

Figure 10:
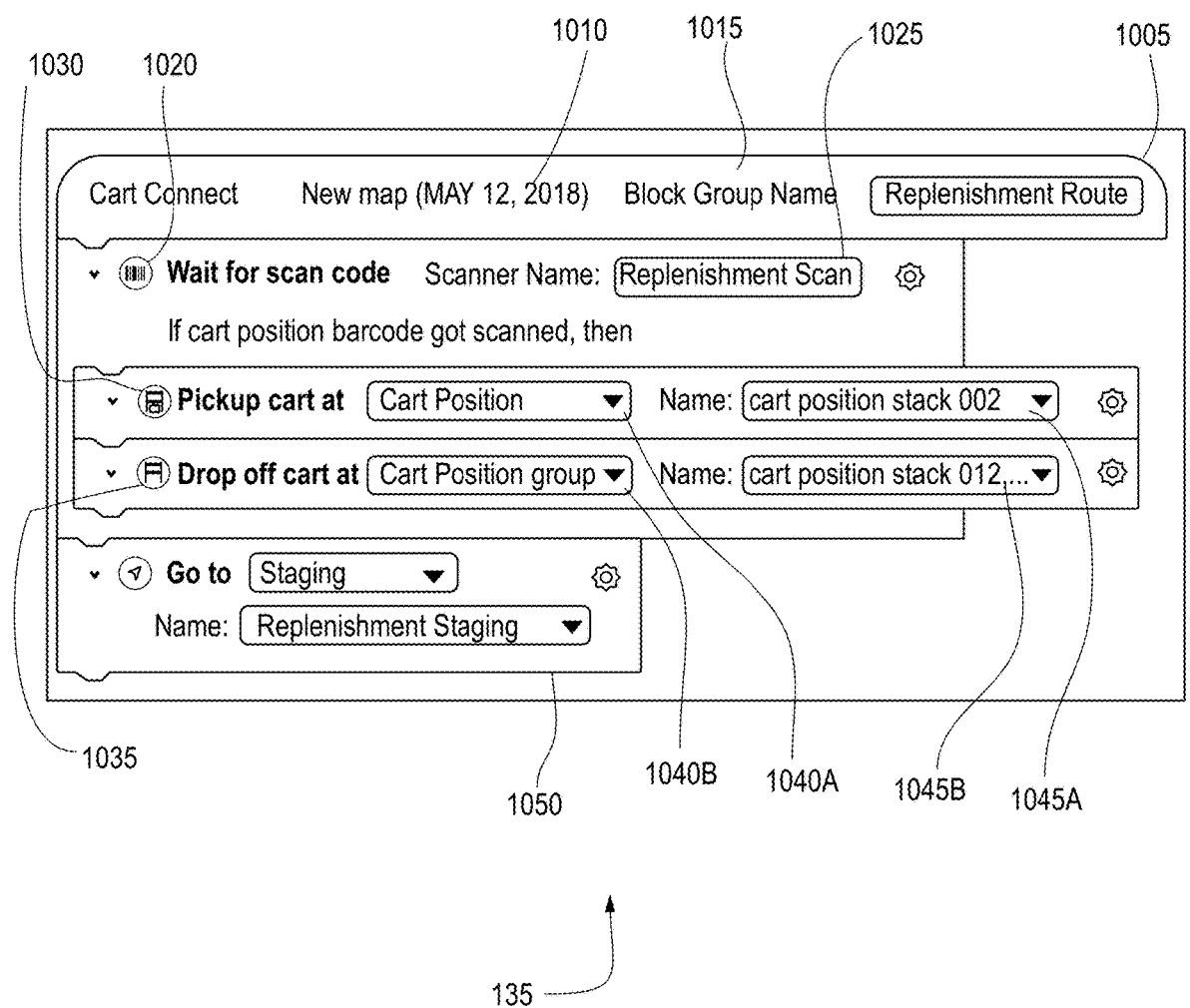
FIG. 10 is a drawing showing a GUI that a user can use to request that a robot do one or more of pick up a cart from a location and drop a cart off at a location.

FIG. 10 is a drawing showing a GUI 135 that a user can use to request that a robot (not shown in this figure) do one or more of pick up a cart (not shown in this figure) from a location and drop a cart off at a location. This figure provides a practical example of how a more complex workflow can be created. This example incorporates code scanning and uses the Blockly visual programming library to add logic to the workflow.

The GUI 135 comprises a cart transfer block 1005 usable by a user to specify a map (not shown in this figure) to be used for the workflow. The GUI 135 further comprises a cart name block 1015 usable by a user to specify a name of the workflow. The GUI 135 further comprises a "wait for scan code" legend 1020 that is displayed when the user is to wait for the GUI 135 to provide a scan code.

The GUI 135 further comprises a scanner name tab 1025 allowing the user to input a scanner name pertaining to the scanning of the code. The GUI 135 further comprises a cart pickup location menu 1030 available to a user to specify a cart transfer location (not shown in this figure) where a cart will be picked up. The GUI 135 further comprises a cart dropoff location menu 1035 available to a user to specify a cart transfer location (not shown in this figure) where a cart will be dropped off.

Within the cart pickup location menu 1030, the GUI 135 presents the user with a cart pickup position menu 1040A. The cart pickup position menu allows the user to select whether the cart is to be picked up from one or more of a cart position and a cart position group. Within the cart dropoff location menu 1035, the GUI 135 presents the user with a cart dropoff position menu 1040B. The cart pickup position menu similarly allows the user to select whether the cart is to be dropped off at one or more of a cart position and a cart position group. A cart position refers to a single cart transfer location, while a cart position group comprises a group of cart transfer locations where the cart to be picked up or dropped off may be at any one of those locations. Cart transfer locations comprised in a cart transfer group generally will be located near each other.

Within the cart pickup location menu 1030, the GUI 135 presents the user with a cart pickup location name menu 1045A. The cart pickup location name menu 1045A allows the user to name the cart pickup location. Within the cart dropoff location menu 1035, the GUI 135 presents the user with a cart dropoff location name menu 1045B. The cart dropoff location name menu 1045B allows the user to name the cart dropoff location.

The GUI 135 further comprises a "Go to" block 1050 available to the user to designate a position to which the robot will go after it does one or more of drop off and pick up the cart. Preferably, but not necessarily, The GUI 135 further comprises a "Go to" block 1050 available to the user to designate a position to which the robot will go after it drops off the cart. Alternatively, or additionally, the "Go to" block 1050 can be positioned above the "wait for scan code" legend 1020, so that the robot goes to the specified location before waiting for the code to be scanned.

FIG. 11 is a flow chart of a method 1100 for a robot-assisted cart-based workflow.

The order of the steps in the method 1100 is not constrained to that shown in FIG. 11 or described in the following discussion. Several of the steps could occur in a different order without affecting the final result.

In step 1110, a server receives a selection by a user of a first cart transfer location as a cart pickup location at which the cart will be picked up. Block 1110 then transfers control to block 1120.

In step 1120, the server receives a selection by the user of a second cart transfer location as a cart dropoff location at which the cart will be dropped off. Block 1120 then transfers control to block 1130.

In step 1130, the server receives a user request that a robot pick up the cart from the cart pickup location and take the cart to the cart dropoff location, the robot operating in a facility, the robot operably connected to the server, the server configured to do one or more of send the robot a cart transfer location usable for transferring the cart and instruct the robot to specify the cart transfer location. Block 1130 then transfers control to block 1140.

In step 1140, the server instructs the robot to navigate to the pickup location to pick up the cart. Optionally, prior to performing this step, the robot awaits a next assignment in a staging area. Block 1140 then transfers control to block 1150.

In step 1150, the server instructs the robot to pick up the cart. Block 1150 then transfers control to block 1160.

In step 1160, the server instructs the robot to navigate to the cart dropoff location. Block 1160 then transfers control to block 1170.

In step 1170, the server instructs the robot to drop off the cart at the cart dropoff location. Block 1170 then transfers control to block 1180.

In step 1180, the server instructs the robot to detach from the cart. Block 1180 then terminates the process.

Optionally, the method comprises an additional step, performed after the final step, in which the server instructs the robot to return to a staging area. For example, the step of instructing the robot to return to the staging area comprises scheduling a future return to the staging area by the robot.

FIG. 12 is a flow chart of a method 1200 for a robot-assisted cart-based workflow.

The order of the steps in the method 1200 is not constrained to that shown in FIG. 12 or described in the following discussion. Several of the steps could occur in a different order without affecting the final result.

In step 1210, a server sends a user a task code indicating one or more of an identity of a robot to perform a pickup of a cart, an identity of a robot to perform a dropoff of a cart, a cart pickup location, and a cart dropoff location. Block 1210 then transfers control to block 1220.

In step 1220, the server receives from the user a scan of the task code indicating that the user wishes the task to be performed. For example, the task code comprises one or more of a bar code and a QR code. For example, this step is performed by receiving the scan from a graphic user interface (GUI). For example, the GUI comprises one or more of a computer GUI and a mobile phone GUI. Block 1220 then transfers control to block 1230.

In step 1230, the server triggers performance of the task. For example, the triggering step includes: instructing, by the server, to the robot, to navigate to the pickup location to pick up the cart; instructing, by the server, to the robot, to pick up the cart; instructing, by the server, to the robot, to navigate to the cart dropoff location; instructing, by the server, to the robot, to drop off the cart at the cart dropoff location; and instructing, by the server, to the robot, to detach from the cart.

Block 1230 then terminates the process.

An advantage of the above workflow according to embodiments of the invention is that the user can have robots wait at specific locations for instructions or go to specific locations after dropping off the cart. This is useful for traffic flow control and for example, if the user knows where the robots will be needed, they can have the robots wait near the pickup locations. In addition, these more complex workflows allow the robot to navigate to intermediate locations between pickup and dropoff.

Another advantage of embodiments of the invention is that the system receives user specifications of one or more of where the robot performs a cart transfer operation and a direction in which the robot performs a cart transfer operation.

A further advantage of embodiments of the invention is that they facilitate workflows for transport of one or more of materials and goods.

It will be understood by those skilled in the art that software used by the method for a robot-assisted cart-based workflow may be located in any location in which it may be accessed by the system. It will be further understood by those of skill in the art that the number of variations of the network, the location of the software, and the like are virtually limitless.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A cart-based workflow system comprising:
a robot operating in a facility;
a server, the server operably connected to the robot, the server configured to store a task code associated with a workflow, the workflow including a cart pickup location, and a cart dropoff location;
a user device operably connected to the server, the user device configured to capture a scan of an instance of the task code displayed in the facility;
the server further configured to receive, from the user device, the scan of the task code, and to trigger performance of the workflow by the robot, by causing the robot to travel to the cart pickup location to pick up a cart, and transport the cart to the cart dropoff location.

2. The cart-based workflow system of claim 1, wherein the task code comprises one or more of a bar code and a QR code.

3. The cart-based workflow system of claim 1, wherein the user device comprises one or more of a computer and a mobile phone.

4. The cart-based workflow system of claim 1, wherein the server is configured, to trigger performance of the workflow, to:
instruct the robot to navigate to the pickup location to pick up the cart;
instruct the robot to pick up the cart;
instruct the robot to navigate to the cart dropoff location;
instruct the robot to drop off the cart at the cart dropoff location; and
instruct the robot to detach from the cart.

5. The cart-based workflow system of claim 1, wherein the user device includes one or more of a mobile phone executing a scanner app, and a scan gun.

6. The cart-based workflow system of claim 1, wherein the task code is displayed adjacent to the pickup location.

7. The cart-based workflow system of claim 1, wherein the server is further configured, prior to storing the task code, to:
receive a selection from the user device of the cart pickup location; and receive a selection from the user device of the cart dropoff location.

8. The cart-based workflow system of claim 1, wherein the workflow further includes a staging area in the facility; and wherein the server is configured to trigger performance of the workflow further by causing the robot to travel from the staging area to the pickup location prior to picking up the cart.

9. The cart-based workflow system of claim 8, wherein the server is configured to trigger performance of the workflow by causing the robot to return to the staging location after transporting the cart to the dropoff location.

10. A method comprising:
storing, at a server, a task code associated with a workflow including a cart pickup location, and a cart dropoff location;
receiving, by the server, from a user device, a scan of an instance of the task code displayed in a facility containing the cart pickup location and the cart dropoff location indication a request that the workflow be performed; and
triggering, by the server, performance of the workflow by a robot, by causing the robot to travel to the cart pickup location to pick up a cart, and transport the cart to the cart dropoff location.

11. The method of claim 10, wherein the task code comprises one or more of a bar code and a QR code.

12. The method of claim 10, wherein the user device comprises one or more of a computer and a mobile phone.

13. The method of claim 10, wherein the triggering step comprises:
instructing, by the server, to the robot, to navigate to the pickup location to pick up the cart;
instructing, by the server, to the robot, to pick up the cart;
instructing, by the server, to the robot, to navigate to the cart dropoff location;
instructing, by the server, to the robot, to drop off the cart at the cart dropoff location; and
instructing, by the server, to the robot, to detach from the cart.

14. The method of claim 10, wherein the user device includes one or more of a mobile phone executing a scanner app, and a scan gun.

15. The method of claim 10, wherein the task code is displayed adjacent to the pickup location.

16. The method of claim 10, further comprising, prior to storing the task code:
receiving, by the server, a selection from the user device of the cart pickup location; and
receiving, by the server, a selection from the user device of the cart dropoff location.

17. The method of claim 10, wherein the workflow further includes a staging area in the facility; and wherein triggering performance of the workflow further comprises, by the server, causing the robot to travel from the staging area to the pickup location prior to picking up the cart.

18. The method of claim 17, wherein triggering performance of the workflow further comprises, by the server, causing the robot to return to the staging location after transporting the cart to the dropoff location.

* * * * *